United States Patent [19]

Williams

[11] 3,823,407
[45] July 9, 1974

[54] DEPTH PENETRATION DRILLING RECORDER

[75] Inventor: Henry L. Williams, Oklahoma City, Okla.

[73] Assignee: Midland Industries, Incorporated, Oklahoma City, Okla.

[22] Filed: Feb. 1, 1973

[21] Appl. No.: 328,751

[52] U.S. Cl. .......................... 346/128, 346/33 WL
[51] Int. Cl. ...................... G01d 5/04, E21b 45/00
[58] Field of Search ...... 346/33 WL, 125, 127, 128, 346/139 R; 73/151.5

[56] References Cited
UNITED STATES PATENTS
| | | | |
|---|---|---|---|
| 2,883,256 | 4/1959 | Nichols | 346/49 |
| 3,216,015 | 11/1965 | Behmoiras | 346/46 |
| 3,742,515 | 6/1973 | Yeiser | 346/49 |

Primary Examiner—Joseph W. Hartary
Attorney, Agent, or Firm—William S. Dorman

[57] ABSTRACT

A recorder for monitoring the depth of penetration and downtime of a drill during drilling operations with respect to drilling time. The recorder includes a chart carried by a rotating drum provided with means to move at a predetermined constant speed and having a chart means carried on the periphery thereof, a recording element being engageable with said chart for making a record thereon, an adjustable recording element deflection and counting means, and an input drive means. The adjustable recording element deflection means, including a cam hub with a plurality of cam arms extending radially outward therefrom and being individually adjustable in length for effecting proportionate deflection of the recording element, is driven by the input drive means and is in communication with the recording element which traces and digitally displays the total depth of penetration and downtime of a drill with respect to time on said chart during drilling operations.

2 Claims, 8 Drawing Figures

DEPTH PENETRATION DRILLING RECORDER

BACKGROUND OF THE INVENTION

1. Field of the Invention

This invention relates to improvements in depth penetration drilling recorders, and more particularly but not by way of limitation, to a depth penetration drilling recorder for providing visual chart recordings of various aspects of drilling operations and in particular, the charting of drill bit penetration with respect to time and down time of the drilling operation.

2. Description of the Prior Art

Heretofore, chart recorders usd in connection with drilling operations have constituted two basic concepts. The first type, as disclosed in the U.S. Pat. to Melton et al, Ser. No. 3,129,997 issued in 1964 and entitled "Well Depth Recorder and Associated Pin Return," utilizes a movable chart which moves at a rate directly proportional to the rate of penetration of the drill bit. In this type of recorder the pin creating the chart is moved continuously at a constant rate of speed until a predetermined increment of drilling depth is completed. In this type of chart the time function is displayed on the abscissa of the chart while the drilling distance or depth of penetration is displayed on the ordinate of the said chart. In this type of chart recorder, the progress of the drilling operations is analyzed by following the ends of the pin traces representing the time required to drill a predetermined increment of depth.

The second type of recorder, as disclosed in the U.S. Pat. to Melton Ser. No. 2,980,486 issued in 1961, and entitled "Recorder" utilizes a chart which moves at a constant rate and a pin which is deflected each time that a predetermined increment of distance has been drilled. Thus, in this type of recorder the time function is displayed on the ordinate of the chart while the abscissa displays the distance of penetration of the drill. On this type of chart recorder the time required to drill a specific distance is measured by measuring the distance between the pin deflections along the ordinate of the chart. The progress of the drilling operation is then determined by the relative spacing between the successive deflections in a given series.

SUMMARY OF THE INVENTION

The present invention contemplates a novel depth penetration drilling recorder which relates to a recorder of the second type described hereinbefore wherein the movable chart is advanced at a constant rate thereby providing the time function along the ordinate of the chart while the depth of penetration information is displayed along the abscissa of the same chart. In the present invention a single pin is used to record depth of penetration and down time of the drilling equipment. The pin is secured to an arm which in turn is keyed to a rotatable shaft so that the said pin will pivot with the shaft as it rotates intermittently. The said shaft is then keyed to a cam follower which is contacted by a plurality of cams of different radial lengths. The cams are in turn secured to a rotatable hub which rotates by an amount directly proportional to the distance of penetration of the drill bit. In this particular application, there are ten such cams which create pin deflection increments going from zero to five upwardly and downwardly again from 5 to 10 thereby returning the pin back to the zero ordinate of the chart after 10 increments of drilling distance have been completed. This results in a stairstep like chart stairstepping from zero to five and back down to zero again which represents 10 feet of drilling distance completed by the drill bit. A clutch mechanism is also provided for disengaging the cam assembly when the drilling operations are stopped. The clutch operator also serves to deflect the pin outwardly along the abscissa of the chart to a predetermined point thereby allowing the constant rate movement of the chart to accurately plot the down time of the drilling operation.

Therefore, in analyzing the chart the number of feet drilled can be quickly determined by counting the number of completed stairsteps displayed and multiplying by ten and the amount of time taken to drill each increment is easily determined by measuring the distance between each abscissa deflection of the needle in creating the stairstep chart. The down time is also easily determinable by measuring the distance between the deflections caused by engaging the clutch and subsequent disengagement thereof.

The end result is therefore a much more easily readable chart provided by a mechanism which is simple and efficient in construction and extremely reliable.

DESCRIPTION OF THE DRAWINGS

Other and further advantageous features of the present invention will hereinafter more fully appear in connection with a detailed description of the drawings in which.

DESCRIPTION OF THE INVENTION

Figure 1:
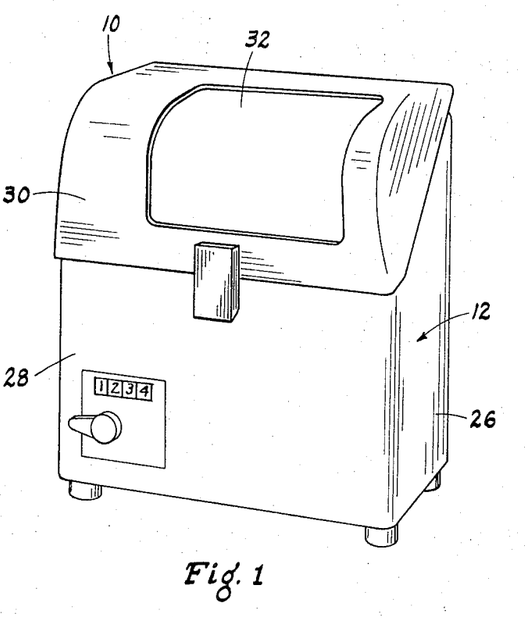
FIG. 1 is a perspective view of the invention.

Referring to the drawings in detail, reference character 10 generally indicates a depth penetration drilling recorder comprising a substantially rectangular housing 12 with a rectangular back plate 14. A rectangular bottom plate 16 is secured to the bottom of the back plate 14 in any well known manner such as by a plurality of bolts 18. Each corner of the base plate 16 is provided with a plurality of downwardly extending mounting studs 20, each having a downwardly extending threaded stud member 22 for mounting the recorder 10 on a base assembly (not shown). The housing 12 also has a pair of oppositely disposed side panels 24 and 26 and a front face panel 28. A top cover 30 is hinged along the top edge of the back plate 14 by means of a hinge member (not shown) which enables the said cover 30 to be lifted for convenient access to the interior of the recorder 10. The top cover 30 is also provided with a contoured transparent panel 32 for ready visual observation of the recorder charts to be hereinafter described without having to raise the cover 30 to view the said charts.

A right hand drum support plate 34 is disposed within the housing 12. The plate 34 is held in place by a plurality of screw members 36 which extend forwardly through the housing back plate 14. A second substantially identical left hand drum support plate 38 is positioned within the upper portion of the housing 12 and disposed with its plane parallel to the plane of the support plate 34 and spaced therefrom. The support plate 38 is held in place by a plurality of threaded screws (not shown) similar to the screws 36 which extend through the back panel 14 of the housing 12.

A cylindrical chart drum 40 is disposed between the support plates 34 and 38 with the axis of the said drum 40 being perpendicular to the plane of the said plates 34 and 38. The drum 40 comprises an outer cylindrical chart holder 42 supported by a pair of perpendicular cross members 44 and 46 at one end thereof and a pair of substantially identical cross members 48 at the opposite end thereof. The cross members 44 and 46 are provided with an outwardly extending centrally disposed boss 50 having a centrally disposed horizontal bore 52 therein and elongated shaft 54 is disposed within the bore 52 and keyed thereto by means of a set screw 56 which extends through the boss 50 and may be tightened against the shaft 54 to effect simultaneous rotation of the drum 40 and the said shaft 54. The shaft 54 is supported within an aperture 58 located in the support plate 34 by a suitable roller bearing means 60. The shaft 54 is held within the roller bearings 60 by suitable retainer ring 62 secured around the shaft and adjacent to the said roller bearings 60. The opposite end of the drum is supported by means of an outwardly extending centrally disposed boss member 62 which is attached to or made an integral part of the cross members 48. The boss member 62 and associated cross members 48 is provided with a centrally disposed bore 64 therethrough and a cylindrical sleeve bushing member 66 disposed within the bore 64. The bushing member 66 may be keyed to the boss member 62 in any well known manner such as by the machine set screw 68 to effect simultaneous rotation of the bushing member 66 with the drum member 40.

A clock drive mechanism 70 is positioned within the housing 12 between the support plate 38 and the housing side panel 24 and secured to the support plate 38 by a plurality of bolts (not shown) with associated nut member 71. The clock drive member 70 may be powered by any well known means such as a battery (not shown) or an external power source (also not shown). The clock drive mechanism 70 is provided with a horizontally disposed drive shaft 72 which extends through an aperture 74 provided in the support plate 38 and the outer end of the bushing means 66. Bushing number 66 is a flexible bushing such as nylon. This provides a clutch arrangement such that the chart drum number 40 may be rotated without causing damage to clock 70. Slip occurs between the clock shaft 72 and the bushing 66. Screw 68 provides an adjustment to increase or decrease the force required to make the clutch slip. Therefore, the drum chart 40 may be rotated about its longitudinal axis at a predetermined constant speed by the clock drive mechanism 70 with its associated drive shaft 72.

A suitable strip chart 78 is positioned around the outer periphery of the cylindrical drum member 42 and held in place by a pair of oppositely disposed chart clamps 80 and 82 located on the outer periphery of each end of the cylindrical chart holder 42. The clamp 80 is provided with a roller head 84 having an attached shaft member 86 which extends through an aperture 88 provided in the cylindrical drum 40 at one end thereof. The shaft member 86 is provided with a hook 90 at the inner end thereof, the said hook serving as a spring retainer for a compression spring 92 which is disposed around the shaft 86 providing pressure between the hook portion 90 of the shaft 86 and the inner wall of the cylindrical drum 40. The compression spring 92 therefore tends to keep the roller member 84 in spring engagement against the face of the cyindrical chart holder 42 to hold the chart firmly in place. The chart clamp 82 is likewise provided with an inwardly extending shaft 94 and a helical compression spring 96 therearound, the said shaft 94 being provided with a hook portion 98 for retraining the said compression spring 96 thereon. The chart 78 used in this application is the pressure sensitive type which utilizes a stylus to remove the emulsion type surface of the chart thereby permitting the basic paper color to show through.

Figure 6:
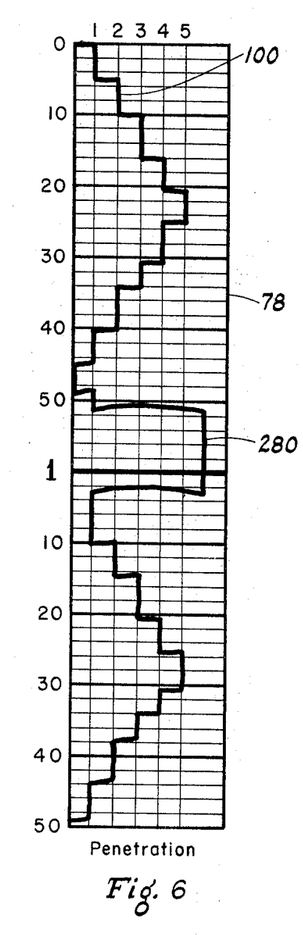
FIG. 6 shows an illustration of the data record output by the invention.

Referring now to FIG. 6, reference character 100 depicts a depth penetration recording which is inscribed on the chart 78 by means of a stylus 102. The stylus 102 is secured at the upper end of a vertically disposed arm assembly 104, the lower end of the arm assembly 104 being keyed to a rotatable shaft 106. The shaft 106 is horizontally disposed within the housing 12 with its axis of rotation perpendicular to the housing back plate 14. The shaft 106 is also keyed to a cam follower 108 which is offset from the axis of rotation of the shaft 106. The cam follower 108 is contacted by a plurality of radially extending cams 110 through 119 having different radial lengths.

The cams 110 through 119 are radially secured around the outer periphery of a circular hub member 120, the said hub member being keyed for rotation to a shaft 122 which is horizontally disposed within the housing 12 in a position perpendicularly to the rotatable shaft 106. The shaft 122 is provided with a worm gear 124 disposed thereabout, the said worm gear 124 being engagable with a worm 126 which is keyed to a vertically disposed shaft 128 positioned adjacent to the said shaft 122. The worm shaft 128 is connected to a means which is responsive to the amount of penetration of the drill bit (not shown) whereby the said worm shaft is made to rotate by an amount directly proportional to the depth of penetration of the drill bit.

One end of the shaft 122 is provided with a pulley member 130 which is provided with a cylindrical hub member 132 which in turn, is keyed to the said shaft 122 for simultaneous rotation therewith. A numerical digital counter 134 is secured to the front panel 28 of the recorder housing 12 for visually displaying the total depth of penetration of the drilling operation. The counter 134 is provided with a pulley wheel 136 having a cylindrical hub member 138 secured thereto, the said hub member 138 being keyed to a shaft 140 for advancing the numerical display (not shown) of the counter 134. The pulley wheel 130 is operably connected to the pulley wheel 136 of the counter by means of an endless belt or chain 142 for purposes that will hereinafter set forth.

The stylus arm assembly 104 comprises an elongated stylus arm member 144 which is vertically disposed and has the stylus 102 secured to the upper end thereof. The stylus arm assembly 104 also comprises a rectangularly shaped vertically disposed block member 146 which has an upwardly extending leaf member 148 secured to the front face thereof. The stylus arm member 144 is secured to the leaf member 148 by means of a threaded screw 150 and retainer block 152. The front face of the block member 146 is provided with a bore 154 therein for receiving a stud member 156. The stud member 156 is provided with a head 158 on the outer end thereof and a compression spring member 160 disposed between the head 158 and the front face of the block 146. The spring 160 forces the head of the stud member 156 outwardly against a stop member 162 for a purpose that will be hereinafter set forth.

The rear bottom portion of the block member 146 is provided with a downwardly extending bifurcated bracket member 164 which is disposed around the rotating stylus shaft 106. The bracket member 164 is pinned to the shaft 106 at the point 166 thereby allowing pivotal movement of the stylus arm assembly 104 about the horizontally disposed pin member 166 while at the same time keying the said stylus arm assembly 104 to be responsive to rotations of the shaft 106 about its center line axis. Therefore it is readily apparent that the compression spring 160 serves to force the stylus 102 against the chart 78 with a force proportional to the spring constant of the compression spring 160. Simultaneously therewith, the stylus arm assembly 104 may still be pivoted in response to rotational movements of the shaft 106 thereby causing the arm 102 to be moved substantially transversely with respect to the direction of movement of the said chart 78 thereby creating the depth of penetration graph 100.

Figure 8:
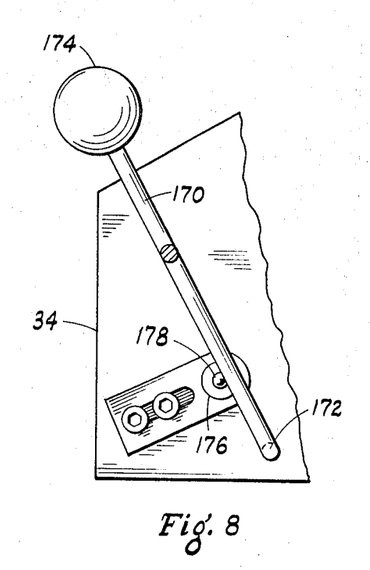
FIG. 8 is a side elevational view of the lifting bar operator rod disclosed by the invention.

The stylus 102 may be lifted from contact with the chart 78 by means of a stylus lifting bar 168 which is horizontally disposed within the housing 12 between the surface of the chart drum 40 and the stylus arm assembly 104. One end of the lifting bar 168 is secured to the mid portion of a lifting bar operator rod 170, the lower end of the said rod 170 being pivotally secured to the drum support plate 34 about a point 172. The upper end of the rod 170 is provided with a ball type handle member 174 which is accessible to an operator when the upper hinged cover 30 is lifted. When the rod 170 is moved forwardly and downwardly, it is readily apparent that the lifter bar 168 will be forced outwardly against the stylus arm assembly 104 thereby overcoming the spring pressure created by the compression spring 160 which in turn will lift the stylus 102 off the chart 78.

To hold the stylus 102 off the chart, a ball plunger assembly 176 is mounted on the drum support plate 34 adjacent to the rod 170 at a point substantially midway between the lifting bar 168 attach point and the rod pivotal point 172. The ball plunger assembly 176 comprises a spring loaded ball member 178 which is contacted by the rod 170 as the said rod 170 moves forward thereby pushing the ball member back until the rod member 170 has passed the said ball member 178. At this point, the ball member 178 pops outwardly thereby holding the rod 170 in a forward and downward position. The stylus 102 may then be put back into pressure contact with the chart 78 by simply moving the lifting rod bar 170 upwardly and rearwardly past the ball plunger assembly which in turn allows the compression spring 160 to force the stylus arm assembly 104 in a rearward direction so that the stylus 102 is applied against the chart 78 under pressure.

Figure 2:
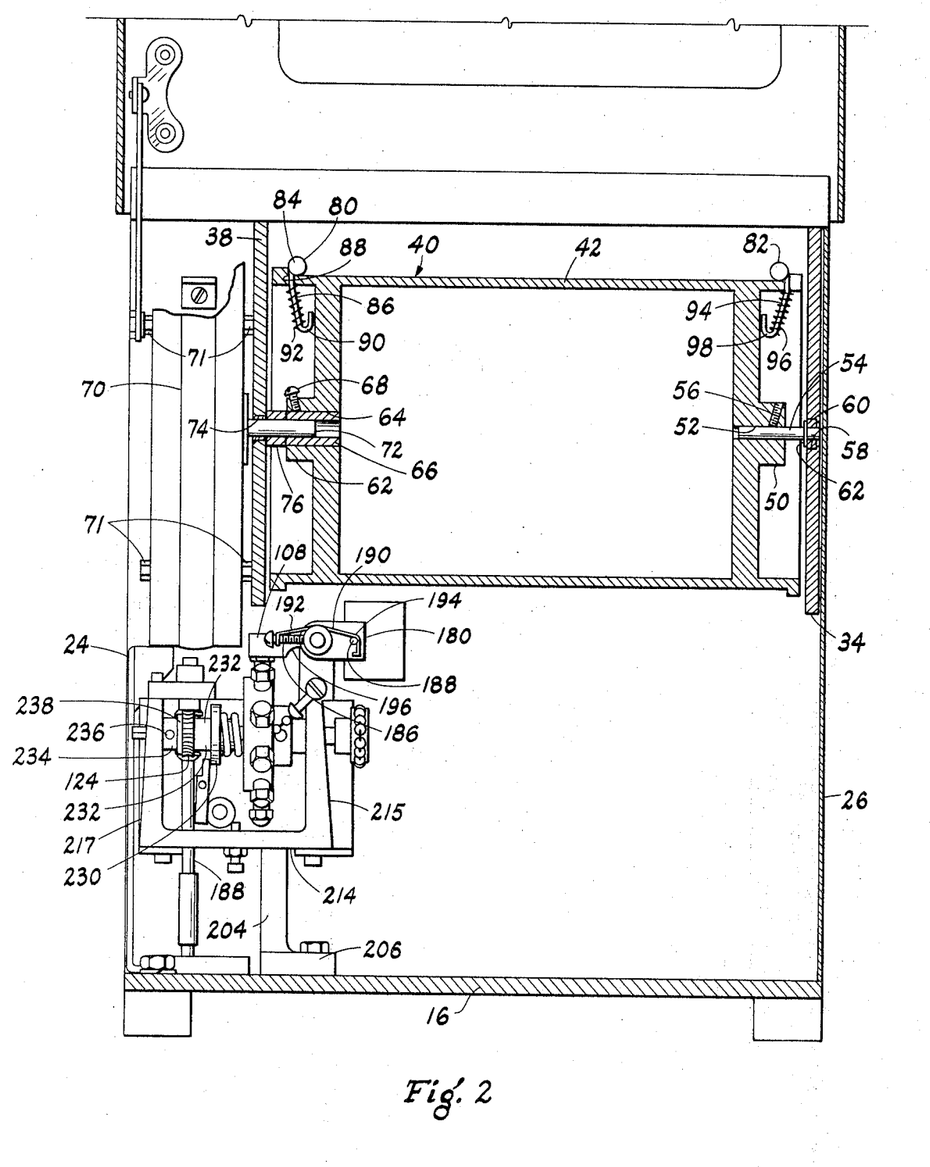
FIG. 2 is a front elevational view of the invention showing the invention with the cover, front face panel, and recording element removed.

An elongated shaft housing 180 is horizontally disposed within the housing 12, the rear end of the said shaft housing 180 being rigidly secured to the housing back plate 14. The forward end of the said shaft housing 180 is provided with a centrally disposed bore 182 extending rearwardly therein, the rear end of the cam follower shaft 106 being journalled therein. A cylindrical hub member 184 is keyed to the shaft 106 between the bracket 164 and the front face of the shaft housing 180. The hub 184 is provided with an outwardly extending stud member 186 secured thereto while the front face of the shaft housing 180 is provided with a forwardly extending stud member 188. A torsion spring member 190 is disposed around the shaft 106 between the hub member 184 and the front face of the shaft housing 180. The front end of the torsion spring 190 has an outwardly extending arm member 192 secured thereto, the outer end of the arm 192 being attached to the outwardly extending stud member 186. The rear end of the torsion spring 190 is provided with an outwardly extending attach member 194 which is secured around the stud member 188 in a manner which will provide a counterclockwise spring loading of the shaft 106 as shown in FIG. 2. This spring loading of the shaft 106 will provide spring pressure on the stylus arm assembly 104 which will tend to force the stylus 102 to the left hand side of the chart 78 or at the zero ordinate on the said chart 78 for a purpose that will be hereinafter set forth.

The shaft housing 180 is provided with a slot cut out on the front left side thereof for attachment of the cam follower 108 thereto. The cam follower 108 is secured to the shaft 106 by means of a follower arm 196 which may be constructed as in integral part of the cam follower 108. The arm 196 is rigidly attached to the shaft 106 for simultaneous pivoting thereof with the rotation of the said shaft 106.

Figure 7:
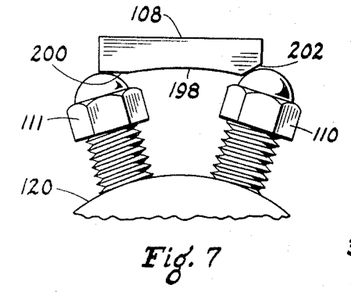
FIG. 7 is a side elevational view of the cam follower disclosed by the invention.

When viewing the cam follower 108 from the front of the recorder, it is substantially rectangular in shape and when viewed from the side as shown in FIG. 7, the top surface is flat while the bottom surface is substantially arcuate in shape. The radius of curvature of the arcuate surface 198 is substantially equal to the radius of the cam hub member 102 plus the average radial lengths of the cams 110 through 119. The forward bottom surface of the cam follower 108 is provided with a small flat segment 200 which connects the front face of the cam follower 108 with the arcuate surface 198. The rear lower edge 202 of the cam follower 108, at the intersection between the arcuate surface 198 and the rear surface of the cam follower 108 is chamfered along the said edge at approximately a 45 degree angle. Therefore, upon rotation of the cams 110 through 119, each cam first contacts the flattened surface 200 and then rides into the arcuate surface 198 thereof and exits the said arcuate surface 198 at the chamfered rear edge 202 thereof.

The cam assembly is supported by a vertically disposed column member 204 having an inwardly extending foot member 206 secured to the base member 204. The foot member 206 is provided with a vertically disposed bore 208 for receiving an upwardly extending threaded stud member 210 therethrough. The stud member 210 is rigidly fixed to the bottom housing plate 16 and the foot member 206 is secured thereto by means of a threaded nut 212 which is tightened about the stud member 210. A U-shaped yoke member 214 is secured to the top of the column member 204 by means of a threaded screw 216 extending downwardly through the yoke member 214 into the top of the base member 204. The shaft 122 is rotatably supported by the upright members of the U-shaped support member 214 by a pair of roller bearings (not shown). The pulley 130 and associated hub 132 are secured to the shaft 122 as hereinbefore set forth at a point outside of the yoke member 214.

The cam hub 120 is provided with a cylindrical extension boss 218 which surrounds the shaft 122 and is provided with a key member 220 for keying the hub 120 to the shaft 122 for simultaneous rotation therewith. A cylindrical spacer 222 is disposed around the shaft 122 for spacing the extension boss 218 from the upright arm 215 of the U-shaped support member 214. The cam hub 120 is provided with a cylindrical bore recess 224 which is centrally disposed therein for receiving one end of a helical compression spring 226 therein. A clutch release hub 228 is rotatably disposed about the shaft 122 between cam hub 120 and the worm gear 124 for receiving the opposite end of the compression spring 226 therearound. The clutch release hub 228 is provided with an outwardly extending flange member 230 for retaining the said compression spring 226.

The worm gear 124 is provided with a hub member 232 which is rigidly secured thereto for contacting the flange 230 of the clutch release hub 228. A cylindrical clutch plate 234 is disposed around the shaft 122 between the worm gear and the upwardly extending support member 217. The said clutch plate 234 is provided with a keying member 236 for keying the said plate 234 to the shaft 122 for simultaneous rotation therewith. The face of the clutch plate 234 is provided with a rubberized disc-shaped pressure plate 238 to provide a high friction surface between the clutch plate 234 and the face of the worm gear 124 for a purpose that will be hereinafter set forth.

A rearwardly extending crossplate 240 is secured to the upper end of the upwardly extending support member 217 by means of a threaded screw 242. The cam drive shaft 128 is supported at each end thereof by suitable bearings (not shown) in the cross support plate 140 and the yoke member 214 of the U-shaped support frame. The worm 126 is secured to the shaft 128 as hereinbefore set forth by a keying member 244. The upper end of the shaft 128 is held in place by a retainer plate 246 with an associated keying member 248.

A clutch operator shaft 250 is horizontally disposed within the housing 112 with the forward end of the shaft 250 being provided with a clutch operator handle 252 which is located outside the housing 12 on the front face panel 28. The operator 250 is supported by a pair of upright support members 254 and 256 which are secured to the base of the U-shaped yoke member 214. The upper end of the support member 254 is provided with a rearwardly extending shaft 258 which rotatably supports a clutch release lever 260 thereon. The clutch release lever 260 may be rotated about the shaft 258, the upper end of the said clutch lever 260 being engagable with the left face of the clutch release hub flange 230. The bottom end of the clutch release lever 260 is disposed in contact with a clutch release cam member 262. The clutch release cam member 262 is substantially cylindrical in shape having a flattened portion 264 on one side thereof. The cam 262 is provided with a bore 266 therein for receiving the clutch release shaft 250 therethrough. The cam 262 is also keyed to the shaft 250 for simultaneous rotation therewith.

The counter assembly 1 is supported by an L-shaped support frame 268 having the rearwardly supporting base leg secured to the bottom of the U-shaped support frame 214 by an upwardly extending threaded screw 270. The counter assembly 134 is then secured to the upright portion of the L-shaped frame 268 by a plurality of rearwardly extending screws 272.

The rear end of the clutch release shaft 250 is provided with a stylus deflection lever 274 scured at right angles thereto. One end of a deflection linkage chain 276 is secured to the outer end of the deflection lever 274. The opposite end of the said chain 276 is secured to the bottom end of a stylus shaft deflection arm 278. The other end of the arm 278 is secured to the stylus shaft 106 at a position aft of the cam follower 108. The housing 180 is provided with a slot type aperture therein to allow pivotal motion of the arm 278 simultaneously with the rotation of the shaft 106 for a purpose that will be hereinafter set forth.

The plurality of radially extending cams 110 through 119 are each provided with a rounded head for contacting the cam follower 108. It is noted that these cams, being adjustable in radial length from the hub 120, may be constructed from simple rounded head screws as shown in the drawings. These ten cams are threadedly disposed within ten threaded apertures distributed evenly around the outer periphery of the hub 120. A plurality of set screws 121 are then provided in the face of the hub 120 in communication with the said threaded apertures for individually locking each cam into position after the proper radial length has been adjusted.

Figure 3:
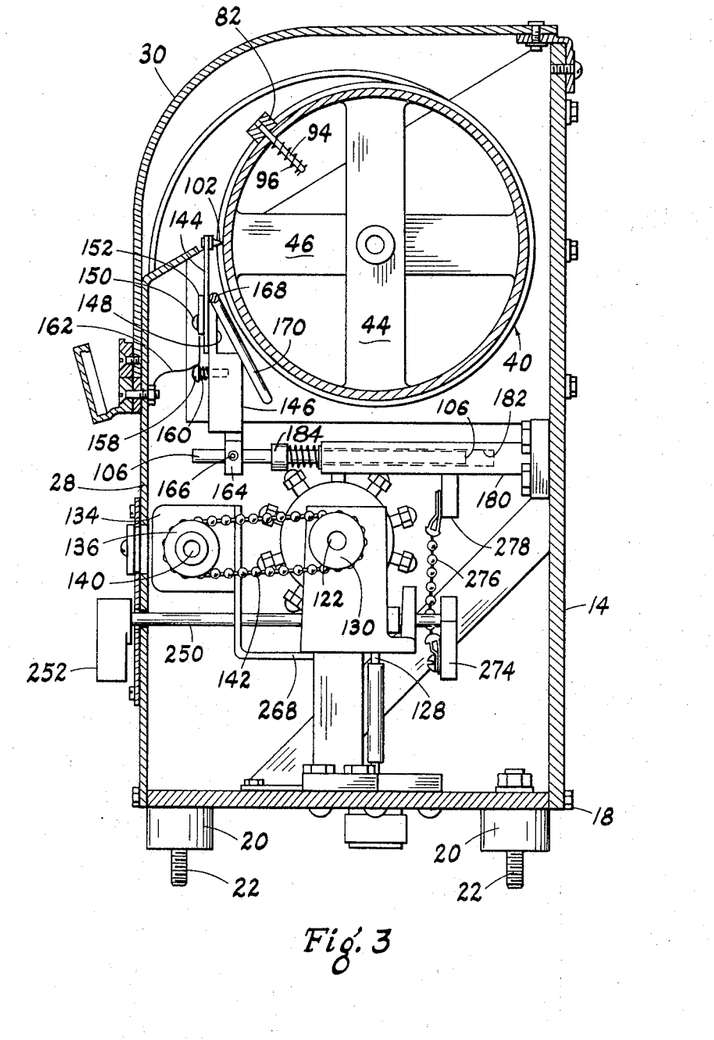
FIG. 3 is a side elevational view of the invention showing the invention with the side panel removed.
Figure 4:
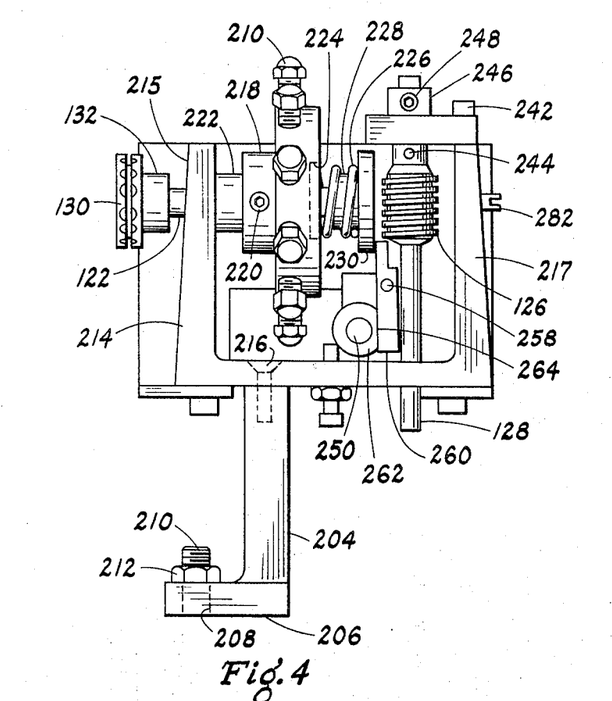
FIG. 4 is a rear elevational view of the recording element deflection means shown in FIG. 2.
Figure 5:
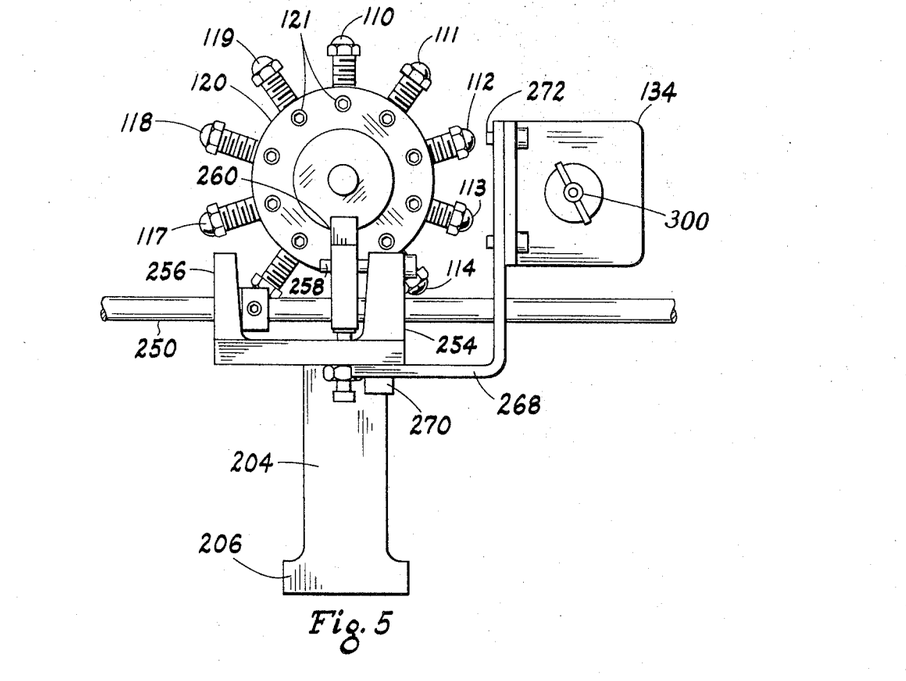
FIG. 5 is a side elevational view of the recording element deflection means shown in FIG. 2 as viewed from the left side of that drawing.

The cams, for this application, are adjusted in radial length as follows:

The first cam 110 is adjusted to a length for positioning the stylus 102 to follow the "o" ordinate line of the chart 78 or to the extreme left, the second cam 111 being adjusted slightly higher than the first cam to a radial length which will position the stylus 102 to trace the "1" ordinate of the chart 78 whereas the third cam 112 will position the stylus at the "2" ordinate. The fourth cam 113 will position the stlyus at the "3" ordinate, cam 114 will position the stylus at the "4" ordinate, and cam 115 will position the stylus at the "5" ordinate line of the chart 78. The seventh cam 116 will position the stylus 102 at the "4" ordinate line, the cam 117 will position the stylus at the "3" ordinate line. Cam 118 will position the stylus at the "2" ordinate line and cam 119 will position the stylus at the "1" ordinate line. The cam hub 120 is geared to rotate in a clockwise direction as viewed in FIG. 3 at a rate proportional to the depth of drilling penetration.

Therefore, it is readily apparent that as the depth of penetration of the drill bit increases, the cams 110 through 119 will alternately contact the cam follower 108 thereby causing the stylus 102 to intermittently move in a transverse direction to that of the movement of the chart 78 thereby creating a stairstep type graph, stepping from "0" to "5" and back down to "0" again for each ten increments of depth penetrated by the drill bit.

When the clutch operator shaft 250 is rotated, the clutch operator cam 262 will rotate the clutch release lever 260 against the flange 230 thereby moving the clutch release hub 228 in a right hand direction against the compression spring 226. The worm gear 124 will no longer be in pressure contact with the clutch pressure plate thereby allowing the worm gear 124 to idle or freely rotate around the shaft 122 which will cause the cam hub 120 to cease rotation. Simultaneously therewith, rotation of the clutch operator shaft 250 will also effect rotation of the stylus deflector arm 174 thereby pivoting the lever arm 278 in a clockwise direction as shown in FIG. 1 which in turn causes a right hand deflection of the stylus 102 to a point beyond the "5" ordinate line of the chart 78 thereby producing a down time graph represented by reference character 280 as shown on the chart 78 (FIG. 6).

One end of the shaft 122 which extends outwardly beyond the upright support arm 217 is provided with key slot 282 therein which may be manually rotated by a key (not shown) to override the clutch pressure plate 238 thereby effecting rotation of the said shaft 122 without rotation of the worm gear 124. This key slot 282 may be used as a clutch override to make correctional adjustments in the counter 134 without effecting a variation in the depth penetration chart 78.

At the start of a drilling operation, the clutch operator shaft 250 may be rotated to engage the clutch mechanism thereby allowing the worm gear 124 to idle about the shaft 122. The counter mechanism may be zeroed by inserting a clock key (not shown) into the key slot 282 and rotating the cam hub 120 so that the cam 110 will be in contact with the curved portion 198 of the cam follower 108 and then zeroing the counter by rotating a zeroing means 300 provided on the counter 134. This will cause the sytlus 102 to be positioned at the "0" ordinate of the chart 78 at the beginning of the drilling operation.

The stylus 102 may then be lifted from the chart drum 40 by rotating the stylus lifter arm 170 forwardly and downwardly past the spring loaded ball plunger assembly 176. The chart 78 may then be placed around the drum surface 42 and clamped into position by the pair of chart clamping means 80 and 82. The drum may then be rotated to a point so that the zero abscissa line of the chart 78 is in line with the stylus 102. It is noted that the drum 40 may be freely rotated independent of the clock shaft 72. The clutch operator arm 250 may then be rotated to release the clutch thereby coupling the worm gear 124 with the shaft 122. This will also move the stylus 102 over in line with the "0" ordinate of the chart 78. The stylus lifter arm 170 is then pushed upwardly and forwardly into an operating position thereby lowering the stylus 102 into pressure contact with the chart 78.

When the drilling operation begins, the clock 70 is activated which produces a constant speed rotation of the shaft 72 thereby driving the drum 40 at a constant rate of speed. As the depth of penetration of the drill bit increases the cam hub 120 with associated cams 110 through 119 will rotate clockwise as viewed in FIG. 3 at a rate which is directly proportional to the rate of depth of penetration of the drill bit. Assuming, for ease of description that the cam 120 rotates one complete revolution for each 10 feet of depth penetration, then the cams 110 through 119 may then be adjusted to provide a stylus deflection of one ordinate line per each foot of depth penetration. Assume also that the chart 78 of FIG. 6 is graduated with the distance between each abscissa line representing two minutes of lapsed time during the drilling operation.

Therefore, as the drilling operation begins, the cam 110 will enter the leading edge of the arcuate surface 198 of the cam follower 108. Since the arcuate surface 198 has a radius of curvature substantially equal to the radial length of the cam 110 the stylus 102 will be held substantially at the "0" ordinate of the chart 78 as the said cam 110 progresses across the arcuate surface 198. After one foot of drilling has been accomplished the cam 110 will exit the arcuate surface 198 at the same time that the following cam 111 contacts the flat surface 200 of the cam follower 108, thereby lifting the cam follower 108 thereby causing a rapid deflection of the stylus 102 to the "1" ordinate of the chart 78. As the cam 111 progresses across the arcuate surface 198, the stylus 102 will remain at the "1" ordinate of the chart 78 until another foot of drilling has been completed where, at that point, cam 112 will again lift the cam follower 108 thereby causing a deflection of the stylus 102 to the "2" ordinate line of the chart 78. It is readily apparent that since the chart 78 is progressing at a constant rate of speed equivalent to one abscissa line for every 2 minutes of operation, the elapsed time for depth penetration of each foot is readily ascertainable by simply measuring the ordinate distance between each deflection of the stylus 102 as shown on the graph 78. It is also noted that with each foot of penetration the counter 134 will be advanced by one increment by means of being directly driven by the chain and pulley arrangement secured to the cam shaft 122. As the depth of penetration increases, the stylus 102 will in a likewise manner be progressively moved across the chart 78 until the fifth ordinate line has been reached and thereafter, the stylus 102 will be progressively moved back across the chart to the "0" ordinate after ten feet of penetration have been completed.

At any time during the drilling operation, when the drill bit is stopped or down for some reason the clutch operator shaft 250 may be rotated thereby engaging the clutch and at the same time causing a deflection of the stylus 102 rapidly to a point on the chart 78 beyond the fifth ordinate. While the drilling operation is stopped the chart will be continually driven, thereby causing the stylus 102 to plot the down time of the drilling operation. When the drilling operation is started again the clutch may be released thereby causing the stylus 102 to deflect back to the ordinate line where it was located when the clutch was engaged. The stylus 102 automatically goes back to the ordinate line where it was located when the clutch was engaged since upon engagement of the clutch the cam hub 120 remains in the same place thereby causing the cam follower 108 to come back into contact with the same cam.

It is readily apparent that other various aspects of drilling operations may be plotted on the chart 78 by simply adding a stylus and deflection apparatus for each bit of information required. Some other aspects which might be desired in conjunction with depth of penetration are bit pressure, bit revolutions per minute, torque pounds per square inch, pump flow and air pressure. However, this particular application relates only to the depth of penetration recording hereinbefore described.

From the foregoing, it will be apparent that the present invention provides a depth penetration drilling recorder which is particularly designed and constructed for providing an easily readable chart which depicts each increment of drilling penetration with respect to time and also plots any down time encountered during the particular drilling operation. The novel depth penetration drilling recorder is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A depth penetration drilling recorder for use in conjunction with the drilling operations comprising a housing, a movable chart mounted within the housing, chart drive means disposed within the housing for moving the chart at a predetermined constant speed, a recording element mounted within the housing and being engageable with the movable chart for making record thereon, recording element deflection means operably connected with the recording element for moving the said recording element step-wise across the chart in a direction substantially transverse to the path of movement of the chart, input drive means operably connected to the recording element deflection means for providing a recording element deflection for each preselected increment of drilling depth penetration for recording the depth of penetration with respect to time, clutch means interconnected between the input drive means and the recording element deflection means, clutch operator means and the recording element deflection means, clutch operator means operably connected to the clutch means for engaging and disengaging the said clutch means, and counter means operably connected to the input driving means for counting and digitally displaying the total depth of penetration whereby the recording element is moved one step transversely across the chart with respect to the path of movement of the said chart for each preselected increment of depth of penetration;

wherein the recording element deflection means comprises a rotatable cam shaft, a deflector cam secured to the cam shaft, said cam shaft being engageable with the input drive means for effecting rotation thereof at a rate proportional to the rate of depth penetration, cam follower means operably connected to the recording element and engageable with the cam for effecting deflection of the said recording element in response to a change in depth of penetration;

wherein the deflector cam comprises a hub member secured on the cam shaft and having a plurality of circumferentially spaced cam arms extending radially outward therefrom, the said cam arms being individually adjustable in length for effecting the deflection of the recording element as each cam arm engages the cam follower;

and wherein the lengths of said cam arms are sequentially adjusted to provide step-wise deflection of the recording element across the chart as the cam rotates, said lengths being selected to provide a sequential deflection of the recording element from a position of no deflection for a first cam arm through successively increasing deflections for successive cam arms to a maximum deflection for an intermediate cam arm, said remaining cam arm lengths being adjusted in reverse sequence to provide a reverse step-wise deflection of the recording element transversely across the chart as the cam rotates, said reverse lengths being selected to provide reverse deflections of the recording element from the maximum deflection of said intermediate cam arm to said position of no deflection of said first cam arm.

2. A depth penetration drilling recorder for use in conjunction with drilling operations comprising a housing, a movable chart mounted within the housing, chart drive means disposed within the housing for moving the chart at a predetermined constant speed, a recording element mounted within the housing and being engageable with the movable chart for making a record thereon, recording element deflection means operably connected with the recording element for moving the said recording element step-wise across the chart in a direction substantially transverse to the path of movement of the chart, input drive means operably connected to the recording element deflection means for providing a recording element deflecton for each preselected increment of drilling depth penetration for recording the depth of penetration with respect to time, clutch means interconnected between the input drive means and the recording element deflection means, clutch operator means operably connected to the clutch means for engaging and disengaging the said clutch means, and counter means operably connected to the input driving means for counting and digitally displaying the total depth of penetration whereby the recording element is moved one step transversely across the chart with respect to the path of movement of the said chart for each preselected increment of depth of penetration;

wherein the recording element deflection means comprises a rotatable cam shaft, a deflector cam secured to the cam shaft, said cam shaft being engageable with the input drive means for effecting rotation thereof at a rate proportional to the rate of depth penetration, cam follower means operably connected to the recording element and engageable with the cam for effecting deflection of the said recording element in response to a change in depth of penetration;

wherein the deflector cam comprises a hub member secured on the cam shaft and having a plurality of cam arms extending radially outward therefrom, the said cam arms being individually adjustable in length for effecting the deflection of the recording element as each cam arm engages the cam follower; and wherein said plurality of cam arms comprises ten circumferentially spaced sequential cam arms, the lengths of the first six cam arms being adjusted sequentially to provide step-wise deflection of the recording element transversely across the chart as the cam rotates, said lengths being selected to provide a sequential deflection of the recording element from a reference "0" deflection for the first cam arm to a maximum deflection for the sixth cam arm, said remaining cam arm lengths being adjusted in a reverse sequence to provide a reverse step-wise deflection of the recording element transversely across the chart as the cam rotates, said reverse lengths being selected to provide reverse deflections of the recording element from the maximum deflection of the sixth cam arm to a reference "1" deflection of the tenth cam arm.

* * * * *